United States Patent Office 3,851,083
Patented Nov. 26, 1974

3,851,083
PROCESS FOR FORMING STABLE FOOD PIECES
Betty L. Brooking, Minneapolis, and William F. Wright, St. Paul, Minn., assignors to The Pillsbury Company, Minneapolis Minn.
Filed Oct. 25, 1972, Ser. No. 300,628
Int. Cl. A23d 5/00
U.S. Cl. 426—363                                    4 Claims

ABSTRACT OF THE DISCLOSURE

Food products are processed to provide a completely balanced diet by incorporating essential nutrients into a unitary, flexible food piece composed of a continuous external phase of a hydrophilic film former, water and an edible humectant. Within the external phase is distributed an internal phase of minute, preencapsulated fat globules and an additional quantity of fat globules which are not pre-encapsulated. The food pieces are resistant to physical, chemical, and bacteriological degradation, remain flexible during storage and do not lose oil when molded or otherwise formed into pieces.

FIELD OF THE INVENTION

Figure 1:
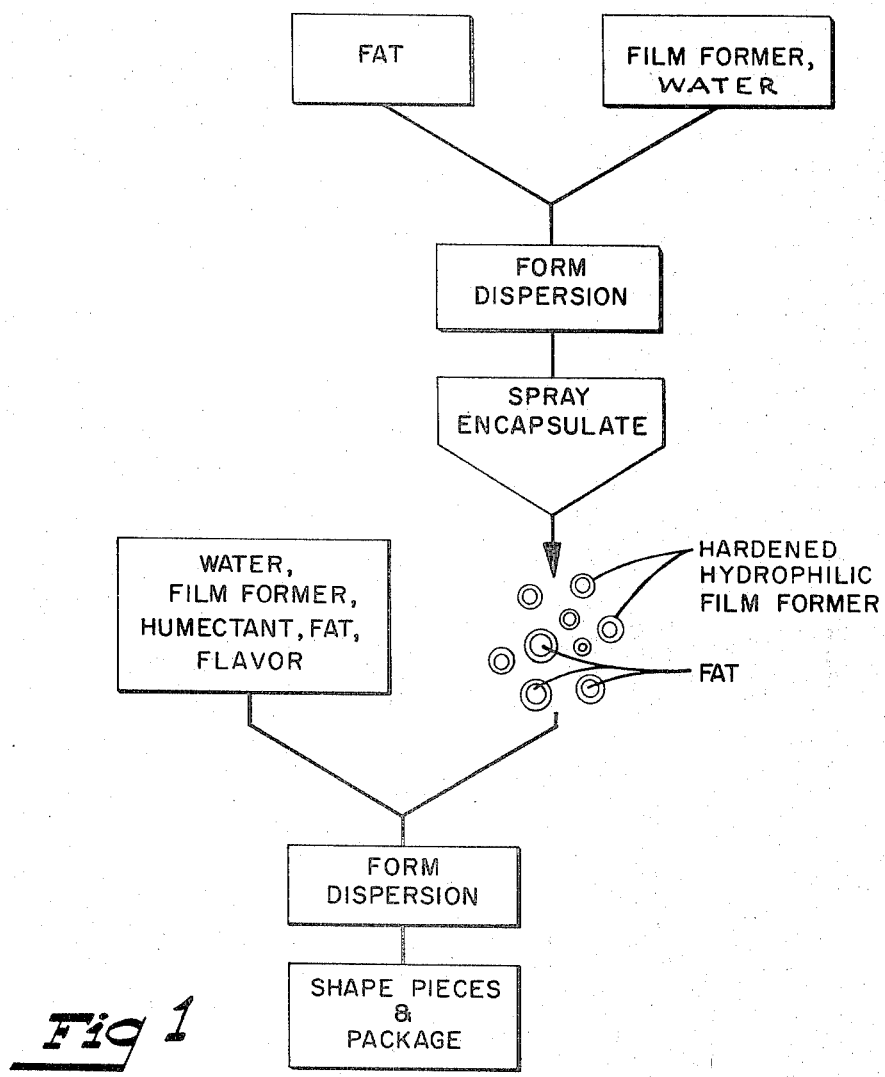

The present invention relates to flexible food products such as food bars and food pieces of other shapes which contain fat, carbohydrate, and protein.

THE PRIOR ART

It is known to form stable food products containing fat, carbohydrate, and protein in which the fat is stabilized against separation (oiling out) when subjected to a stable dispersion test. The product is made by adding sodium caseinate and sucrose to the heated oil. Separately gelatin or other protein is added to cold water, allowed to swell and is heated to an elevated temperature, is poured rapidly into the oil portion while maintaining vigorous agitation. The need to provide a shelf stable, compact, nutritious food product for individuals such as campers, soldiers, and space-travelers and the like has long been recognized. Food products that contain the maximum nutritional value especially in respect to protein and caloric content without concomitant, unnecessary bulk and weight (i.e., the minimum volume to weight ratio) are deemed essential for such a utility.

The edible fats are most suitable solely on a volume to weight basis in providing the necessary caloric requirements in such a food product. However, from a physical, chemical and bacteriological stability viewpoint, the utilization of fats presents many problems which prevents the use thereof. A major problem with fat is its incompatibility with other solid food ingredients. Considerable difficulty has been encountered in preventing fat separation from the other solid constituents especially when the food products are subjected to abnormal conditions (e.g., temperature and humidity). Once separated from the other constituents, the fat readily degrades (e.g. oxidative degradation). U.S. Pat. 3,434,843 describes a good means for preparing such products but some trouble is experienced in commercial size plant runs with oil loss when sigma blade mixers and screw extruders are used for forming the pieces. The use of protein encapsulated spray dried oil will reduce oil loss but makes the product tend to be dry, somewhat crumbly and lack flexibility.

An additional requirement for such a food product is that it maintains its flexibility until consumed. Palatability in respect to flavor, texture and the like should remain substantially unchanged and not become crumbly when chewed nowithstanding exposure to abnormal conditions over prolonged periods of time. Also, it has been desired to provide a solid food product which contains a homogeneous distribution of the caloric and proteinaceous requirements (preferably along with the other essential nutrients). Such a food product can be orally consumed in such a manner that a given amount of the product will provide ordinary and necessary nutritional food requirements for the consumer.

OBJECTS OF THE INVENTION

The primary objects of the invention are (a) to provide a process for forming stable food pieces containing water, edible saccharide (either a mono or a disaccharide) typically having a ratio of about one part protein to three parts of shortening, three parts syrup, four parts of water, wherein flexibility can be reliably maintained during the normal storage and shipment period without the loss of shortening during extrusion or other phases of manufacturing, (b) mixing, handling, and forming into pieces of the desired size and shape can be readily carried out at satisfactory operating speeds and without special attention, (c) chewing characteristics remain satisfactory throughout the normal period of storage (e.g. one year to eighteen months).

THE FIGURES

Figure 2:
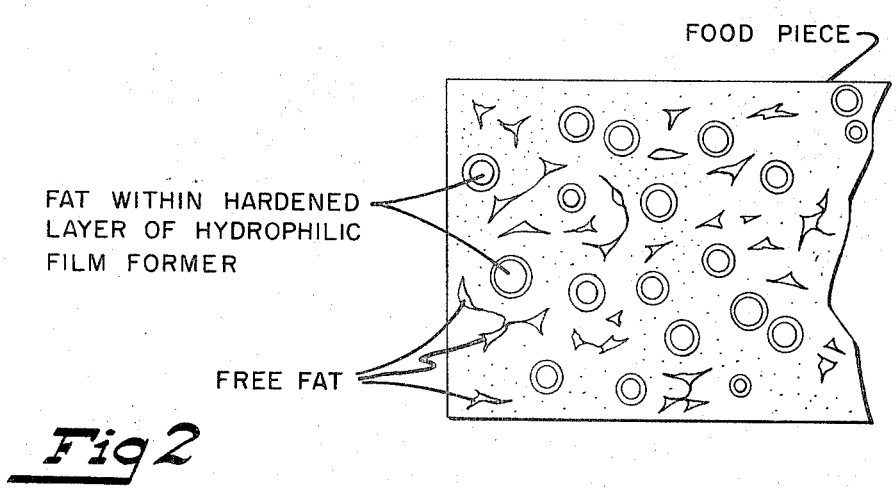

FIG. 1 is a schematic flow diagram of a preferred form of the invention.
FIG. 2 is a semi-diagrammatic, highly magnified view of a food piece prepared in accordance with the invention.

SUMMARY OF THE INVENTION

Food products are processed to provide a completely balanced diet by incorporating essential nutrients into a unitary, flexible food piece containing a continuous external phase of a hydrophilic film former, water and an edible humectant. The external phase encapsulates an internal phase of minute fat globules. The minute fat globules are present in two different physical forms. In one form the fat globules are pre-encapsulated within a continuous hardened layer to provide a relatively stable coating composed of a solidifed hydrophilic film former. In the other form fat is distributed randomly through the composition and is dispersed within the hydrophilic film former phase but is not preencapsulated in a hardened coating. The food pieces are resistant to physical, chemical, and bacteriological degradation, do not exude oil when extruded and remain flexible and chewy when stored.

While the principle of operation of the invention is not known with certainty it is believed that by segregating a portion of the protein and fat so that when mixed, a plasticizer (water, glycerine and corn syrup) is available for the portion of the protein or other film former that is not spray dried a finished product results that is more stable against oiling out than if no free-protein is used (i.e. in the event all the protein is used for encapsulating fat). As a result of the preesnt process, a quasi-encapsulation of the free fat is obtained. This quasi-encapsulation of the fat is different from the encapsulation of the spray-dried fat largely because of the different content of water, glycerine, and corn syrup which functions as a plasticizer for the free-protein. Thus the finished pieces are resistant to hardening with time and yet there is enough structural integrity to prevent the loss of oil during forming. When the pieces are extruded and chilled, the plastic fat (free-fat) gives structrual stability and the dispersed protein provides greater chewiness and more apparent moistness. Moreover, the presence of emulsifier prevents a tight encapsulation of the free-fat as well as reducing the loss of fat during extrusion or forming.

In accordance with the preferred form of the invention the free-fat is a plastic edible fat while the encapsulated fat is a normally liquid fat.

GENERAL DESCRIPTION OF THE INVENTION

According to the present invention there is provided a new method of forming a solid, flexible, water-dispersible, unitary food piece consisting essentially of an external phase and an internal phase, said external phase comprising a homogeneous dispersion of a hydrophilic film former, an edible humectant which has a boiling point and decomposition temperature in excess of 300° F. in an amount ranging from at least 1 part by weight to about 70 parts by weight humectant for each 10 parts by weight hydrophilic film former and water in an amount of at least 1 to about 30 parts by weight water for each 10 parts by weight hydrophilic film former, said internal phase comprising edible fat globules. The fat globules are pre-encapsulated within a shell of a hardened hydrophilic film former. Additional fat globules (free fat) are dispersed in and encapsulated within a mixture of hydrophilic film former and water. The total fat content is present in an amount ranging from about 150 parts by weight fat to about 1 part by weight fat for each 10 parts by weight hydrophilic film former.

The food pieces of the present invention are characterized by better retention of chewiness and flexibility throughout storage without loss of oil when extruded, good impact strength against shattering, lack of hygroscopcity and a low permeability to gases and moisture. The food pieces are stable against substantial reduction or increased flexibility when subjected to humidity variations of the surrounding atmosphere. At elevated temperatures (e.g. 300° F.) unwrapped food pieces will ultimately degrade by charring rather than separation of the internal phase from the external phase. Similarly, the food pieces are not deformed when subjected to elevated temperatures (e.g., 100° F.). Since the fat is encapsulated in two ways and protected by the external phase, the pieces are not subject to rancidification (e.g., oxidative degradation).

Examples of suitable edible film forming substances for the external phase include egg albumin, serum albumin, sodium proteinate of soybean, wheat germ, gelatin, sodium or calcium caseinate, nonfat dry milk solids, coprecipitates of lactalbumin and casein, whey protein, cottonseed protein isolates, whole egg, pea flour, bean flour, corn germ, gelatinized starch, carboxymethyl cellulose, agar agar, fish protein, gelsoy (soybean protein), whey, dextran, dextrins, bran protein, polyvinyl alcohol, polyvinyl-pyrrolidine, calcium alginate, potassium alginate, carrageenin and salts thereof, hydroxypropyl cellulose, methyl cellulose, methyl ethyl cellulose, gum acacia, locust bean gum, gum ghatti, guar gum, gum karaya, oat gum, gum tragacath, mixtures thereof and the like.

In addition to the edible film forming substances, the external phase contains water and an edible humectant. The edible humectants employable herein have an affinity for water and maintain a narrow range moisture content fluctuation when exposed to a wide and varied range of humidity. In general, the humectants adaptable herein exhibit either solid or liquid properties (i.e., non-gaseous) at temperatures in excess of 300° F. at 760 mm. pressure. Preferably, those humectants which are solid or liquid at 760 mm. pressure at 350° F. or above are employed. Suitable humectants which are normally liquid at room temperature but possess a definitive boiling point are glycerine and propylene glycol. These normally liquid humectants provide a permanent plasticizing effect and are preferably employed herein as the humectant component. Other materials which exhibit humectant properties are those which in the dry form decompose at elevated temperatures rather than volatilizing. Suitable solid humectants include the dry solids of invert sugar-containing materials such as molasses, honey, brown sugar, papylon, fruit juices, starch hydrolyzates (e.g., corn syrup), sorghum, etc., as well as the aqueous solutions thereof and invert sugar itself. Other solid humectants include such edible materials as calcium chloride, fructose, maltose, sorbitol and the like. The amount of humectant contained in the external phase broadly ranges from at least one part by weight to about 70 parts by weight humectant for each 10 parts by weight hydrophilic film former.

In addition to the aforementioned film formers and humectants, the external phase contains water in an amount ranging from at least 1 part by weight to about 30 parts by weight water for each 10 parts by weight hydrophilic film former therein. A substantial portion of the water may be provided in the external phase by the employment of humectants such as honey, molasses, starch hydrolyzate syrups, cane juice, inverted fruit juices and the like. Advantageously, the amount of water and edible humectant to hydrophilic film former in the external phase respectively ranges from about 5 to about 15 and 3 to about 30 parts by weight for each 10 parts by weight hydrophilic film former.

The term "edible fat" as employed herein refers to both solid and liquid oils. The term "edible oil" refers to those edible fats which are normally liquid at room temperature. Example of edible fats include lard, margarine base, margarine, a solid butter fat, butter oil, the hydrogenated and non-hydrogenated oils of cottonseed, corn, soy and safflower mixtures thereof and the like. The fat is provided in the instant food pieces as minute fat globules which are uniformly dispersed throughout the food pieces.

Depending upon the desired product, various other conventional food ingredients in varying amounts may be included in the present food pieces. Typical food in-agents include preservatives, antioxidants, firming agents, texturizers, flavoring and coloring agents (e.g. see pp. 65–258 and pp. 49–53 of Chemicals Used in Food Processing, publication 1274 by the National Academy of Sciences et al.).

THE PREFERRED EMBODIMENT

As can be seen by reference to FIGS. 1 and 2, the fat globules are pre-encapsulated within a coating of a hardened hydrophilic film former. Additional fat globules (free fat) are dispersed in and encapsulated within a mixture of unhardened film former, the hardened coating may or may not be a coagulated form of a coagulable protein but must be resistive to dissolution when placed in the dispersion.

Concerning the ratio of free and non-free fat, it has been found that from about 25% to 75% of the fat should be precoated and preferably from 75% to 25% should not be precoated. While any amount of precoated fat will produce some resistance to oiling out, about ¼ to ⅓ of the fat should be in this state to provide a noticeable effect. One preferred free fat is a plastic shortening with a Wiley melt index of about 99±2° F. The encapsulated fat is normally a liquid and the free fat is normally a plastic shortening.

Considering the water in the corn syrup, about six parts of water is used for each one part of humectant (glycerine). An effective amount of an emulsifier is added to the dispersion to prevent too tight an encapsulation of the free fat thereby reducing the loss of free fat when the pieces are formed.

In order to obtain the food product of the present invention, it is essential that a stable dispersion containing the free fat, encased fat, film former, water and humectant be provided. Stability of the dispersion (i.e. a stable dispersion) can be readily ascertained by mixing a drop of the admixture in 100 ml. of hot water (130° F.) and then observing whether or not fat separation results. A stable dispersion will not release the fat (i.e., fat lakes will not appear at the water surface).

A suitable method of providing the food pieces of the present invention is to prepare the fat encased in hardened shells of hydrophilic film former as shown in FIG. 1 by forming a stable dispersion e.g. of sodium caseinate, corn syrup, citric acid and fat and encapsulating by spray drying at 400° F. These particles have an average size of about 30 to 90µ. They are than mixed with the remaining edible fat and additional edible hydrophilic film former and a sufficient amount of water and edible humectant at a temperature sufficient to melt the fat and for a period of time sufficient to provide a stable dispersion consisting essentially of an external phase of hydrophilic film former, water, humectant and an internal phase of an edible oil. The fluidity of the stable dispersion is maintained by elevating the temperature of the dispersion during mixing and extrusion. It is desirable to either refrigerate, to set the dispersion or place the dispersion in a mold to premanently set it in the form of a food piece having the characteristics herein described.

Another method of providing the present food pieces is to admix the fat with a heat coagulable film former and a sufficient amount of water and edible humectant at a temperature sufficient to melt the fat but below the coagulation temperature of the film former for a period of time to blend uniformly. The stable dispersion is then heated to a temperature and for a period of time sufficient to heat coagulate the film former. Suitable heat coagulable film former for this method include animal albumins such as egg albumin. After heat coagulation, the stable dispersion may then be put into the desired size and shape and dried.

When fats which are normally solid at room temperature are employed, the aerated product and fat is maintained at a temperature greater than the melting point of the fat. Other additives such as sugar, ungelatinized starch, coloring and flavoring agents, etc., may be admixed and uniformly distributed throughout the stable dispersion after formation of the stable dispersion. Advantageously, the stable dispersion containing other food additives is provided as an extrudable mass through a die orifice (preferably a non-adherent orifice such as a polytetrafluoroethylene orifice) and cooling the extrudate (e.g., in cool air), the present food pieces can be produced in a continuous cooling manner.

Drying the food pieces is conducted in a manner such that the resultant product has a moisture content of at least about 7 weight percent and generally less than about 20 weight percent. The preferred moisture level for the food pieces ranges from about 8 to about 15 percent by weight.

In a more limited aspect of the invention there are provided food pieces which contain a uniform distribution of proteinaceous and caloric food ingredients throughout the food piece. Based upon a food piece having a weight ranging from about 350 to about 1000 grams, such food pieces are adapted to provide at least 2800 kilocalories and at least 40 grams of protein containing the essential amino acids (i.e., the minimum daily adult male protein and caloric requirements). Advantageously provided are those food pieces that on a weight basis ranging from about 400 to about 800 grams and preferably less than 600 grams provide the minimum daily adult requirements in respect to protein and calories.

The prerequisite proteinaceous requirements may be provided by employing proteinaceous materials as the hydrophilic film former. Illustrative proteinaceous film formers for this purpose include egg albumin, hydrolyzed soy protein, corn germ, gelatin, sodium caseinate, nonfat dry milk solids, wheat germ, fish protein, bran protein, mixtures thereof and the like. If nonproteinaceous film formers (e.g. carboxymethyl cellulose, gelatinized starch, agar agar, dextran, polyvinyl alcohol, etc.) are primarily employed, the prerequisite proteinaceous requirements may be provided in the external phase by non-film forming food components such as torula yeast and denaturized egg albumin. Essential amino acids e.g., arginine, cystine (L-form), hisdine (L and DL forms), isoleucine (L and DL forms), leucine (L and DL forms), lysine (1 and DL forms), DL methionine, phenylalanine (L and DL forms), threonine, valine (L and DL forms) and tryptophane (L and DL forms) may be employed to provide the prerequisite protein requirements. Amino acid supplements such as alanine, aspartic acid, cystine, lysine monohydrochloride, proline, serine may also be incorporated in the food pieces.

A major portion or all of the prerequisite caloric requirements in the food pieces may be provided by the two internal fat phases. Additional edible caloric ingredients such as torula yeast, dextran, gelatinized and ungelatinized starches (e.g. corn, high amylose corn, wheat, sago, potato, waxy maize, tapioca and rice starches), sugars or sugar bearing substances (e.g., sucrose, dextrose, lactose, maltose, corn syrup, honey, molasses, etc.), mixtures thereof and the like may be incorporated into the external phase.

It is an essential step in preparing the present invention to provide fat encapsulated in a shell of hardened film former as well as fat not encapsulated in a hardened shell, both of which are stable against fat separation when subjected to the stable dispersion test hereinbefore described. To provide food pieces which are stable against fat separation, particular care to maintain the stable dispersion must be exercised throughout subsequent processing steps.

Food pieces which are comprised of a substantial amount of other food additives (other than the fats, hydrophilic film former and water and/or humectant) are best incorporated into the food pieces by first providing the stable dispersion and then adding and admixing the other food additives for a period of time sufficient to homogeneously disperse the other ingredients within the stable dispersion. A substantial quantity of these other food additives may be incorporated into the stable dispersion as a solid or solute. Since the stable dispersion is not adversely affected by the addition thereto of additional water and/or humectant, additional water and/or humectant can be employed to facilitate the incorporation of the other food additives within the stable dispersion. When food particles are provided in the external phase, such food particles typically have a particle size of less than 250 microns and usually less than 150 microns.

The food pieces of the present invention can be provided in various sizes and shapes such as cubes, sheets, bars, rods, etc. The food pieces are of unitary construction that in any given portion of the food piece (e.g., 300 milligram portion) will have substantially the same uniform distribution of food constituents and nutritional value as another portion thereof. In general, specific density of the instant food pieces is greater than 1.10 and most generally in the range of about 1.2 to about 1.4.

All quantities mentioned herein are on a percent by weight basis or part by weight basis as indicated.

The fat encapsulated within the hardened shells of film former provides one of the sources of fat and protein in the product. The primary purpose of the drying of the ingredient is to encapsulate the fat to thereby prevent separation during manufacture of the finished product. Moisture content of the finished dried particles should be between 1% and 3%, with 2.5 being typical. One preferred shortening to be used in the particles is a blend of vegetable oils to produce a consistency somewhat softer than hard butter and containing a small amount HA 0.10% BHA as a freshness preserver. Its solid fat index is as follows:

50° F. _____ 30±3.0% solids.
70° F. _____ 18±3.0% solids.
80° F. _____ 13±3.0% solids.
92° F. _____ 2% minimum solids.
100° F. _____ 1.5% maximum solids.

The invenition will be better understood by reference to the following examples:

EXAMPLE 1

Fat encapsulated in hardened shells is prepared as follows: 40 parts of vegetable fat having the solid fat index set forth immediately above, 25 parts sodium caseinate, 35 parts of corn syrup (DE 42), 0.25 part citric acid and 100 parts water is made into a dispersion and spray dried at about 400° F. to form vegetable oil globules encapsulated within hardened shells of a hydrophilic film former composed of sodium caseinate and corn syrup. This premix is employed to form a food piece using the following formulation:

| | |
|---|---|
| Encapsulated vegetable oil (spray dried) | 54 |
| Corn syrup | 99 |
| Sucrose (powdered) | 114 |
| Water | 14 |
| Humectant (glycerine) | 8 |
| Waxy maize starch | 5 |
| Sodium caseinate | 18 |
| Emulsifier (distilled monoglycerides) | 1.8 |
| Chocolate flavor | 30 |
| Free fat (Wiley melting point 99° F.±2° F.) | 21.3 |
| Salt | 0.8 |
| Non-fat dry milk | 7.5 |

Using a suitable blender such as a ribbon blender, a preblend is made comprising one-half of the formula amount of powdered sugar, all of the starch, monoglycerides, cocoa, and salt. This will prevent lumping of the cocoa and the starch when they go into the slurry to form the dispersion. The ingredients should be sifted going into or out of the blender. To a covered, jacketed, stainless steel kettle equipped with a scraper-agitator add the ingredients listed above in the following order (a) corn syrup, (b) water and (c) glycerine; mix for 30 seconds and add the powdered, preblended starch, sugar, monoglycerides and flavor and heat with mixing to the proper transfer temperature (about 155° F. minimum), to regulate the final batch temperature to between about 123° F. and 129° F. The free shortening is added while heating and blended to form a dispersion. The dispersion is transferred to a mixer such as a sigma blade mixer in which flavoring is added. To a ribbon blender add the remainder of the formula amount given above of the sucrose, sodium caseinate and spray dried encapsulated fat and dry blend. Add this blend to the dispersion in the sigma mixer while it is running and mix for about 3–5 minutes (30 r.p.m. for a 1000 lb. batch sigma mixer). The final temperature should be about 123° F. to 129° F. to provide the proper forming and the shaping consistency. The product is then moulded, for example, by extrusion, cooled and packaged.

EXAMPLE 2

A composition is prepared as in Example 1 except that a coprecipitate of lactalbumin and casein is employed in place of sodium caseinate.

EXAMPLE 3

A composition is prepared as in Example 1 except that gelatin is employed together with sodium caseinate in a ratio of about 5 parts gelatin for 8 parts of sodium caseinate.

EXAMPLE 4

A composition is prepared as in Example 1 except that soy protein is used in place of sodium caseinate and non-fat dry milk.

EXAMPLE 5

A composition is prepared as in Example 1 with the following change: Potato solids are used in place of sucrose in an amount equal to the amount of corn syrup solids present.

EXAMPLE 6

A composition is prepared as in Example 1 except that calcium caseinate is employed in place of sodium caseinate.

EXAMPLE 7

A composition is prepared as in Example 1 except that whey protein isolates are employed in place of sodium caseinate.

EXAMPLE 8

A composition is prepared as in Example 1 except that cottonseed protein isolates are employed in place of sodium caseinate.

What is claimed is:

1. A method of preparing solid, flexible, water dispersible food pieces having impact strength against shattering and of unitary construction in that any given 300 mm. portion thereof will have substantially the same uniform distribution of food constituents as another portion thereof, said method comprising the steps of
   (a) providing minute droplets of an edible fat encapsulated within a hardened shell of a hydrophilic film former,
   (b) forming a stable dispersion comprising in part an external phase, said external phase comprising a homogeneous continuous dispersion of 10 parts by weight of a hydrophilic film former, at least 1 part by weight to 70 parts by weight of an edible humectant and water,
   (c) incorporating into said dispersion as an internal phase thereof, edible fat globules in two physical forms, one form comprising said fat globules encapsulated within the hardened shells of the hydrophilic film former and additional fat globules free from said hardened coatings and dispersed uniformly within the external phase, the total fat being present in an amount ranging from about 150 parts by weight to about 1 part by weight of fat for each 10 parts by weight hydrophilic film former, the fat encapsulated within the hardened shells being present in the amount of from about 1 part for each 2 parts of the free fat to about 2 parts to each 1 part of free fat, the minute droplets of edible fat encapsulated within hardened shells comprise a normally liquid fat and the free fat comprises a normally plastic fat and an effective amount of an emulsifier is added to the dispersion to reduce encapsulation of the free fat and reduce oil loss of the free fat during forming of the pieces, and
   (d) maintaining the moisture level of the stable dispersion to provide a food piece having a moisture content from at least about 7% by weight to about 20% by weight to thus provide a solid food piece having impact strength against shattering and retaining its flexibility throughout storage without having a endency to lose fat during fabrication and forming into pieces.

2. The process of Claim 1 wherein the encapsulated fat is prepared by admixing about 40 parts of vegetable oil, about 25 parts of an edible milk protein, and about 35 parts of corn syrup and about 90 parts by weight of water, mixing until a uniform dispersion is obtained and thereafter sprayyng the dispersion into hot air at a temperature elevated above ambient conditions to dry the spray thereby encapsulating the fat.

3. The method of Claim 1 wherein about 6 parts by weight water is mixed with about 1 part by weight of glycerine.

4. The method of Claim 1 wherein the finished dispersion is extruded through a die opening to produce an elongated extruded ribbon and the moisture level of the extruded material is maintained at from about 8–15% water by weight.

References Cited

UNITED STATES PATENTS

| | | | |
|---|---|---|---|
| 3,434,843 | 3/1969 | Durst | 426—363 |
| 3,431,112 | 3/1969 | Durst | 426—203 |
| 3,594,176 | 7/1971 | Morris | 426—362 |
| 3,383,219 | 5/1968 | Patterson | 426—98 |

A. LOUIS MONACELL, Primary Examiner

J. M. HUNTER, Assistant Examiner

U.S. Cl. X.R.

426—98, 356, 362